US007768935B2

(12) United States Patent
Ou et al.

(10) Patent No.: US 7,768,935 B2
(45) Date of Patent: Aug. 3, 2010

(54) SYSTEM AND METHOD FOR PROVIDING TOPOLOGY AND RELIABILITY CONSTRAINED LOW COST ROUTING IN A NETWORK

(75) Inventors: Canhui Ou, Danville, CA (US); Mung Chiang, Princeton, NJ (US); Zhi Li, San Ramon, CA (US); Orestis Manthoulis, Sausalito, CA (US); Xiaochuan Yi, San Ramon, CA (US); Kaiyan Chen, Pleasanton, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 929 days.

(21) Appl. No.: 11/403,510

(22) Filed: Apr. 12, 2006

(65) Prior Publication Data

US 2007/0242608 A1    Oct. 18, 2007

(51) Int. Cl.
G01R 31/08 (2006.01)
(52) U.S. Cl. .................. 370/252; 370/229; 370/258; 370/238
(58) Field of Classification Search .......... 370/200–253, 370/272–309, 431–546
See application file for complete search history.

(56) References Cited

U.S. PATENT DOCUMENTS

| 6,973,269 | B1 | 12/2005 | Britz et al. | |
|---|---|---|---|---|
| 2002/0036988 | A1* | 3/2002 | Cardwell et al. | 370/238 |
| 2004/0068556 | A1* | 4/2004 | Radpour | 709/223 |
| 2005/0002405 | A1 | 1/2005 | Gao | |
| 2005/0289623 | A1* | 12/2005 | Midani et al. | 725/100 |
| 2006/0198302 | A1* | 9/2006 | Sofman et al. | 370/229 |

FOREIGN PATENT DOCUMENTS

| EP | 1263 258 A2 * | 12/2002 |
|---|---|---|
| EP | 1263258 A2 | 12/2002 |

OTHER PUBLICATIONS

Gerstel, Ornan, et al., "Cost-Effective Traffic Grooming in WDM Rings", *IEEE/ACM Transactions on Networking*, 8(5), (Oct. 2000),618-630.
Reed, Daniel A., "Packet Routing Algorithms for Integrated Switching Networks", *ACM SIGMETRICS Performance Evaluation Review*, 15(1), (1987),7-15.
Towles, Brian, et al., "Throughput-Centric Routing Algorithm Design", *Proceedings of 15th Annual ACM Symposium on Parallel Algorithms and Architectures (SPAA '03)*, (Jun. 2003),200-209.
Ziane, Saida, et al., "A Swarm Intelligent Multi-Path Routing for Multimedia Traffic Over Mobile Ad hoc Networks", *Proceedings of the 1st ACM International Workshop on Quality of Service & Security in Wireless and Mobile Networks (Q2SWinet '05)*, (Oct. 13, 2005),55-62.

* cited by examiner

*Primary Examiner*—Ricky Ngo
*Assistant Examiner*—Iqbal Zaidi

(57) ABSTRACT

Various embodiments of the disclosed subject matter provide methods and systems to generate node-disjoint routing paths from a root node to each node in a network node set, identify potential intermediate office node (IO) candidate pairs from the generated node-disjoint routing paths, generate a per central office node (CO) serving cost estimate for each IO candidate pair, and identify a low cost IO candidate pair having at least two node-disjoint paths to the root node without traversing nodes along a diverse path between the low cost IO candidate pair and subtending CO nodes.

27 Claims, 8 Drawing Sheets

SYSTEM AND METHOD FOR PROVIDING TOPOLOGY AND RELIABILITY CONSTRAINED LOW COST ROUTING IN A NETWORK

TECHNICAL FIELD

The disclosed subject matter relates to the field of network communications, and more particularly to methods and systems including providing topology and reliability constrained low cost routing in a network.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2006, SBC Knowledge Ventures L.P. All Rights Reserved.

BACKGROUND

In recent years, network providers have been integrating services to support voice, data, and video communication (sometimes referred to as triple-play services). The result has been a variety of new service offerings such as voice over Internet protocol (VoIP) and Internet protocol television (IPTV) in addition to the traditional services of telephone and data communications. The triple-play services have taxed the existing network infrastructures given that the network bandwidth requirements, transmission behaviors, and reliability requirements are different for each of the various services.

Thus, a system and method for low cost routing in topology and reliability constrained networks is needed.

DETAILED DESCRIPTION

In the following detailed description, reference is made to the accompanying drawings that form a part hereof, and in which are shown by way of illustration, specific embodiments in which the disclosed subject matter can be practiced. It is understood that other embodiments may be utilized and structural changes may be made without departing from the scope of the disclosed subject matter. The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

As described further below, according to various example embodiments of the disclosed subject matter described herein, there is provided a system and method for low cost routing in topology and reliability constrained networks. The system includes a low cost network design generator operable to produce a low cost network design in topology and reliability constrained networks. An embodiment is described below in connection with FIG. 1.

Figure 2:
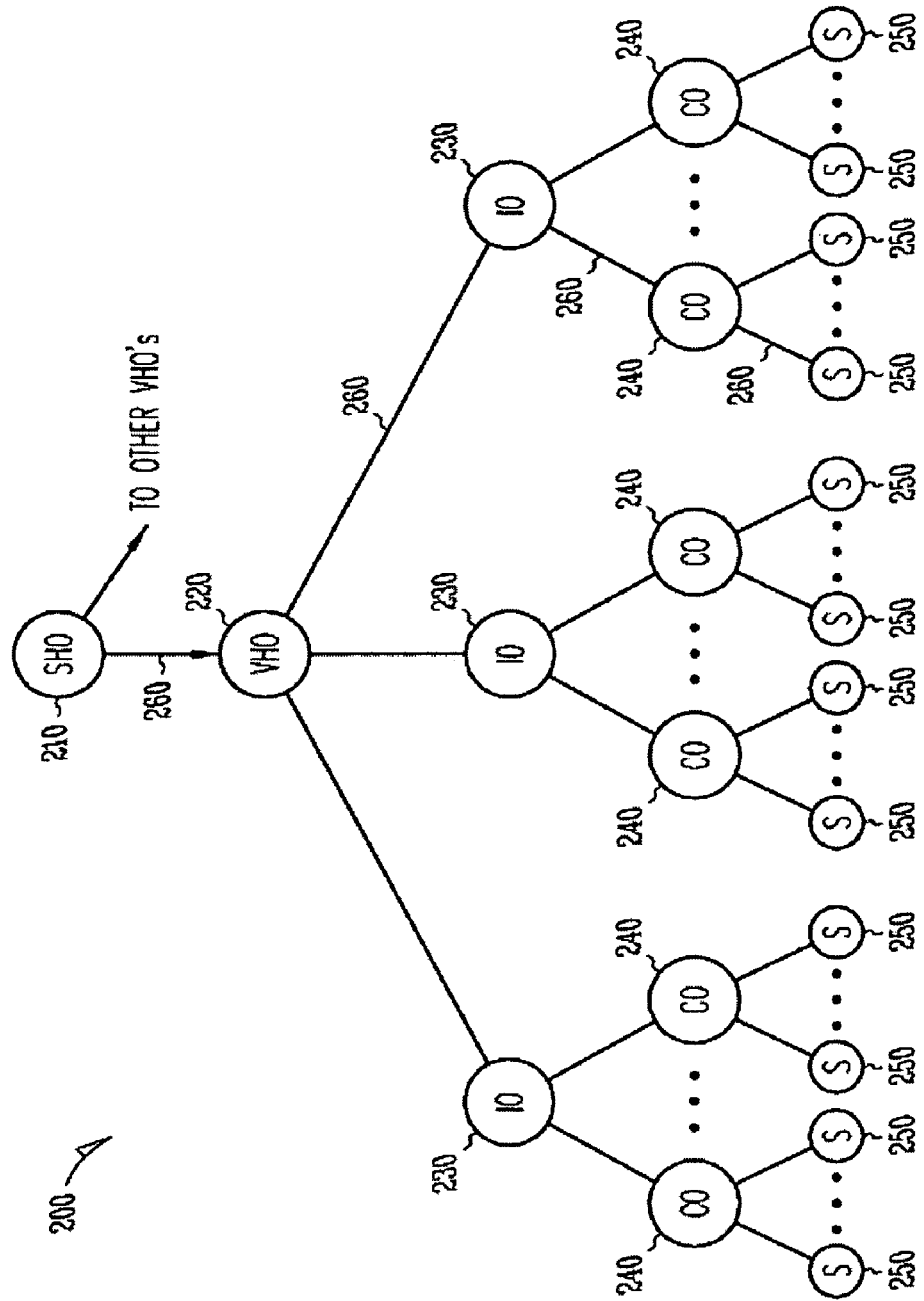
FIGS. 2, 3, and 4 illustrate one example implementation of a triple-play system or network of an embodiment of the disclosed subject matter hereof.
Figure 3:
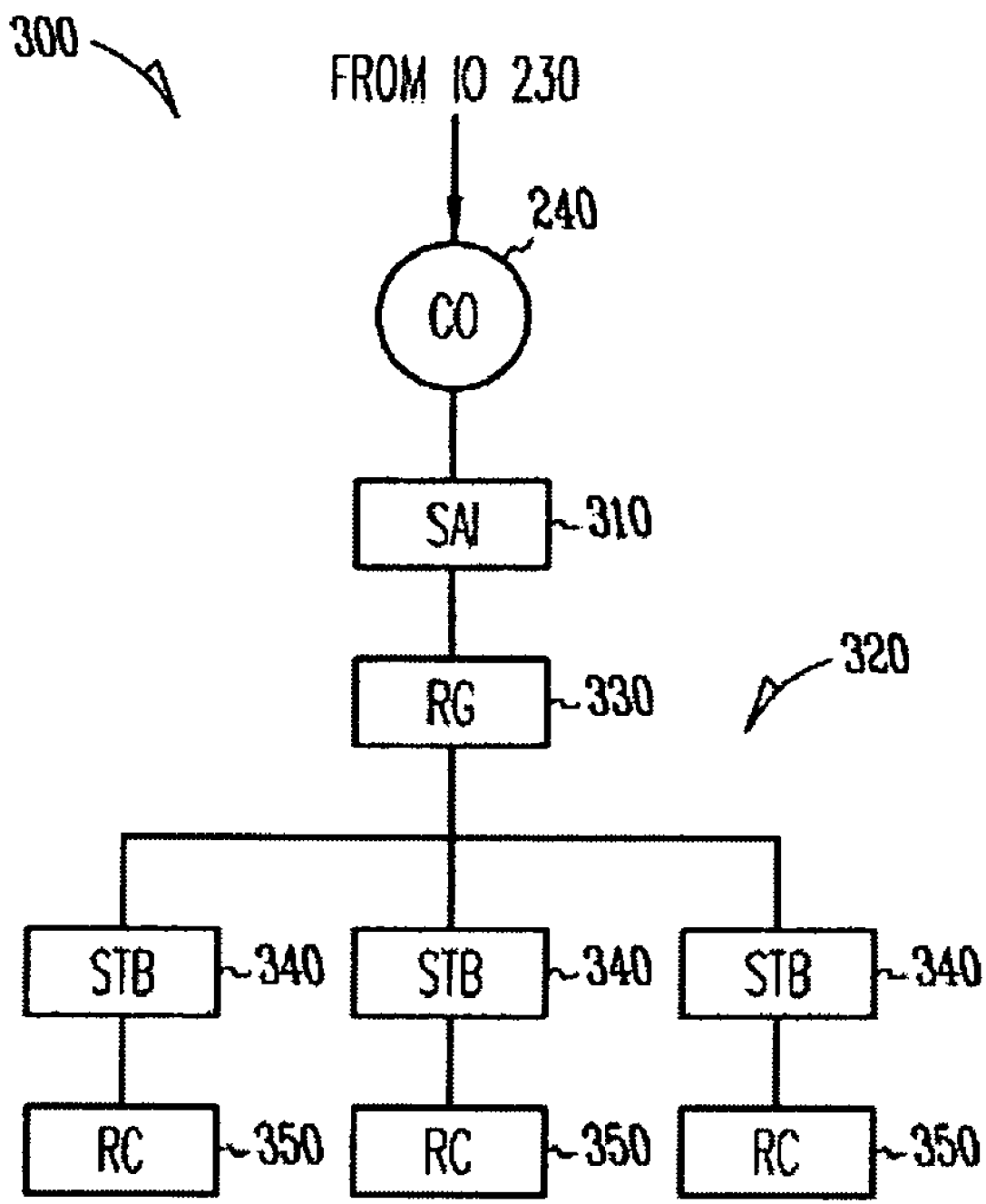
Figure 4:
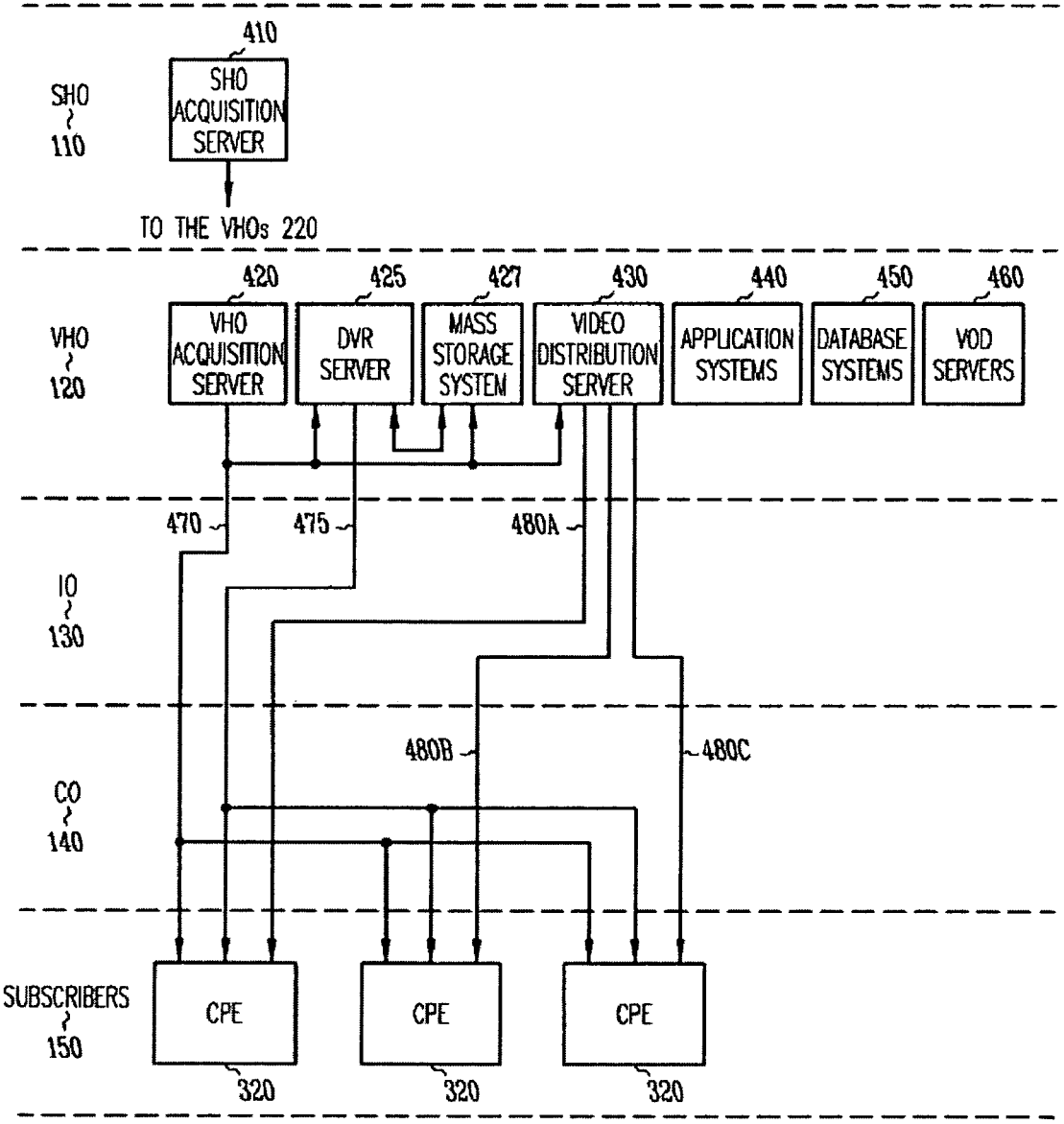

Referring now to FIGS. 2, 3, and 4, there is illustrated one example embodiment of a triple-play system or network 200, using IPTV technology in this example but not limited thereto, adapted to provide, among other things, the triple-play services in an embodiment of the disclosed subject matter. As shown in FIG. 2, the network 200 may include a super hub office (SHO) 210 for acquisition and encoding of video content, one or more video hub offices (VHO) 220 in each demographic market area (DMA), one or more intermediate offices (IO) 230, one or more central offices (CO) 240 located in each metropolitan area, and, finally, the subscribers (S) 250, who may be located in single or multiple dwelling units. In one example embodiment, the network 200 may be connected through a plurality of high speed communication links 260 using physical transport layers such as fiber, cable, twisted pair, air, or other media.

In one example embodiment of an IPTV video delivery system, the SHO 210 distributes content to one or more VHO's 220 which may be spread across a wide geographic territory, such as an entire country. The SHO 210 may, for example, be in a central location for acquisition and aggregation of national-level broadcast TV (or linear) programming. A redundant SHO 210 may be provided for backup in case of failure. The SHO 210 may also provide the central point of on-demand content acquisition and insertion into the IPTV network. Linear programming may be received at the SHO 210 via satellite and processed for delivery to the VHO 220. On demand content may be received from various sources and processed/encoded to codec and bit-rate requirements for the communication network for transmission to the VHO 220 over the high speed communication links. The VHO's 220 are the video distribution points within each demographic market area (DMA) or geographic region.

Referring now to FIG. 3, there is illustrated, in more detail, an example network architecture 300 between the CO 240 and the subscriber 250. A serving area interface (SAI) 310 may be connected to the CO 240. SAI 310 may, for example, be located in a weather-proof enclosure proximate the subscriber 250 premises, and may include fiber-to-the-node (FTTN) equipment. FTTN equipment may also be located in the CO 240. Customer premise equipment (CPE) 320 includes, for example, a network interface device (NID) and a residential gateway (RG) 330, with a built-in very-high-bit-rate digital subscriber loop (VDSL) modem or optical network termination (ONT). In either case the RG 330 may be connected to the rest of the home set top boxes (STB) 340 via an internal network such as an Ethernet. Each STB 340 has an associated remote control (RC) 350 which provides data entry to the STB 340 to control the IPTV selections from the IPTV data streams.

Referring now to FIG. 4, which illustrates one example embodiment of a configuration according to the disclosed subject matter, a SHO acquisition server 410 may be used to acquire national content that may be distributed towards the VHO 220. In an alternative embodiment, live television content may be acquired using an acquisition server in the VHO 220. In this configuration, the VHO 220 may include a live television acquisition server 420 and a video distribution server 430, which forward the live television and/or other content toward the subscribers 250 through the intermediate offices (IO's) 230 and the central office (CO) 240. A VHO 220 may also include application systems 440, regional subscriber 250 database systems 450, and VOD servers 460. The CO's 240 are connected to the IO's 230 to further distribute traffic towards the subscribers 250. Traffic may reach the subscribers 250 at least partially via either fiber to the node (FTTN) or fiber to the premises (FTTP), or by other types of transmission medium.

As also illustrated in FIG. 4, acquisition server 420 may distribute a plurality of live television programs, each typically associated with a television "channel," using a multicast IP protocol data stream 470 through the IO's 230 and CO's 240 to the subscribers 250. The routers, switches, and other network elements that would normally be present in the IO's 230 and CO's 240 are not shown in FIG. 4 in order to simplify the drawing. The number of programs or channels sent in the multicast stream may, without limitation, range up to 800 channels or more using present technology, with it being understood that advances in technology may allow many more channels to be sent. The multicast protocol allows for efficient distribution of these signals to a large number of end subscribers 250. In addition, the video distribution server 430 receives the multicast data stream 470, and distributes selected ones of the live television signals, extracted from the stream 470, using a unicast data stream 480$a$, 480$b$, or 480$c$, to specific subscribers 250. In this embodiment, video distribution server 430 may provide a unicast stream, for example in burst mode, of a specific live television channel to any of the subscribers 250 served by the VHO 220. The burst mode instant channel change data stream can be discontinued once the subscriber's 250 system is loaded with enough TV program data so that the multicast stream can "catch up" and take over supplying the program data stream in the multicast mode for more extended term viewing by the subscriber 250.

Also provided in the VHO 220, or alternatively at another distribution point in the IPTV network such as the SHO 210, IO 230, or CO 240, is an additional digital video recorder (DVR) server 425 that acquires live television programming, records the programming/channels in digital form, and distributes the recorded content to subscribers 250 using a unicast data stream in the same manner as server 430. DVR server 425 may be connected to, in one example embodiment, one or more mass storage devices or systems 427, such as magnetic disk drives or optical recording systems. In addition, DVR server 425 includes software 426 to support interaction with subscribers 250 through STB 340. For example, subscribers 250 can, interact with the DVR server 425 using a remote control 350 and an STB 340 to request programming be saved, view saved programming on their own list of saved content, and request delivery of the saved content to them from DVR server 425. Alternatively, in another embodiment, the functions described for DVR server 425 may be performed by a single acquisition server such as server 420 or VOD server 460, and DVR server 425 can be eliminated in whole or in part. The subscribers 250 may request content recorded on DVR server 425, which is delivered, in one example embodiment, with unicast data streams 490A, 490B, or 490C.

Although the sample network architecture described above is shown in an example form implemented in an IPTV distribution system, the various embodiments described and claimed herein may be implemented in a cable television system, in a broadcast television system, or in a satellite distribution system, or other distribution systems, for example a broadband wireless distribution system. In addition, according to another example embodiment, popular or favorite programs may be recorded using the subscriber's STB 340 instead of the DVR server 425, allowing recording of shows to take place on the edge of the distribution system.

The various embodiments described and claimed herein relate to the generation of a network design with low overall cost in terms of equipment cost (e.g. network routers) and transmission cost (e.g. fiber communication lines) for the metro portion of networks to support triple-play (voice, data, or video communication) services. If fibers and/or wavelength division multiplexed (WDM) systems are the only transmission facilities, the embodiments described and claimed herein provide a complete design methodology for the metro portion of triple-play services networks. If conventional rings are deployed, the embodiments described and claimed herein provide a methodology for the near-optimal placement of intermediate office (IO) router pairs and the logical demand from central offices (CO's) to IO's and from IO's to a Video Headend Offices (VHO). The various embodiments described and claimed herein can be generalized as a topology and reliability constrained low cost logical routing system and method.

As will be described in more detail below, the various embodiments disclosed and claimed herein considers both green-field design and brown-field design. For green-field design, the embodiments described and claimed herein generate a near-optimal design from scratch for the first forecast year and an incremental design for each subsequent forecast year. For brown-field design, the embodiments described and claimed herein incrementally augment the existing design for each year based on the forecast without re-homing existing CO's.

The network design problem solved by various embodiments described herein can be abstracted as follows:

Given:
(1) A metro network as a bidirectional graph G=(V,E,L,S, $C_s$,$C_n$), where V represents the set of CO's, E represents the set of bidirectional fibers, L:E→float defines the length of each fiber, S:E→int defines the number of spare fibers, $C_s$:E→int defines the cost of spare fibers per mile, and $C_n$:E→int defines the cost of putting new fibers per mile.
(2) A multi-year traffic forecast which specifies the amount of unicast traffic and multicast traffic at each CO on a yearly basis.
(3) VHO location, $v_{VHO}$, where $v_{VHO} \in V$.
(4) Cost of the different network elements/components (e.g. routers and switches, and related chassis and line cards, etc.).

Find for each year a design, which includes:
(1) A set of CO pairs where a pair of network elements (e.g. routers) should be placed. These CO pairs are referred to as IO pairs.
(2) A fiber route connecting each IO pair.
(3) Two diverse fiber routes connecting each IO pair to the VHO.
(4) A list of CO's subtending to each IO pair.
(5) Two diverse fiber routes connecting each subtending CO to an IO pair.

Subject to, in one embodiment:
(1) Every IO pair can serve up to n CO's (e.g. n=10).
(2) The fiber route connecting an IO pair should be diverse to the two diverse fiber routes connecting the IO pair to the VHO and to the two diverse fiber routes connecting the IO pair to each subtending CO.

(3) The design for year Y should be a subset of the design for year Y+1, i.e., we incrementally augment the network without disrupting the existing infrastructure.

With the objective of:
(1) Minimizing total cost, i.e., equipment cost (e.g. network elements, such as routers and switches) and fiber cost, of the design for the first year and the incremental cost for subsequent years.

Figure 1:
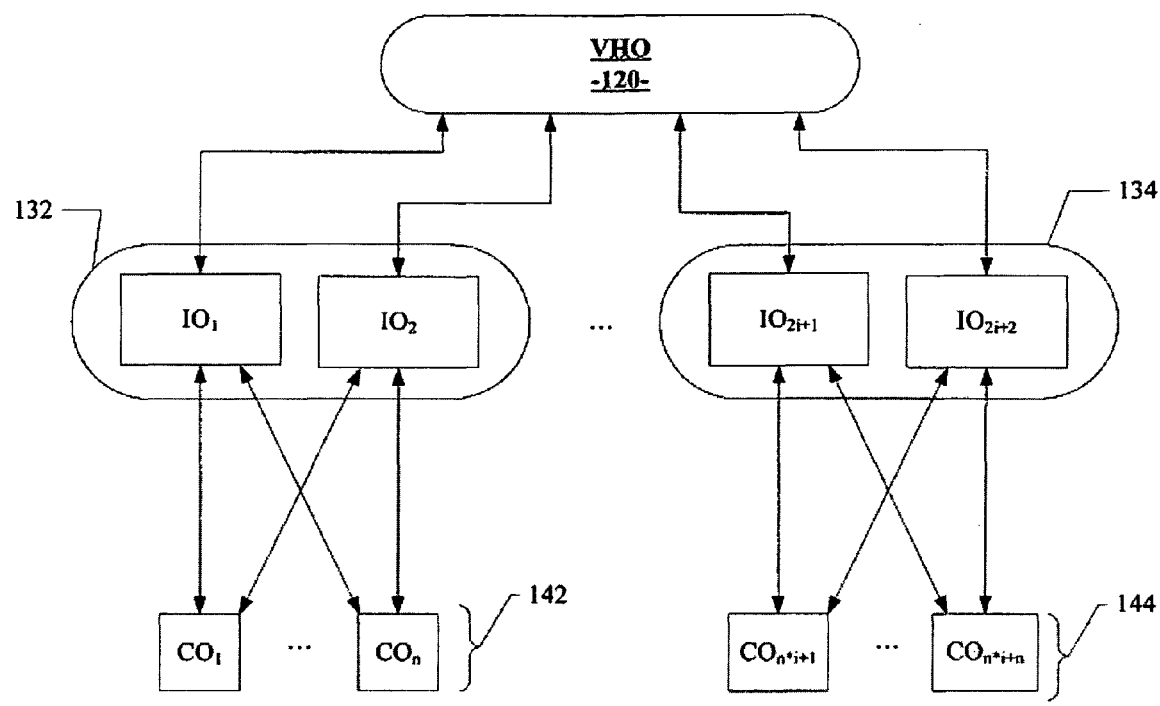
FIG. 1 illustrates a sample network topology of one example embodiment of the disclosed subject matter hereof.

The solution to the network design problem set forth above should look logically like FIG. 1. As shown in FIG. 1, logically, an IO network element pair 132 connects to a VHO 120 directly and will not connect directly to another IO network element in a different IO network element pair 134.

Inputs: Various embodiments use inputs that can be described as follows:
(1) A graph $G=(V,E,L,S,C_s,C_n)$ representing the metro network under study.
(2) The VHO location $v_{VHO} \in V$.
(3) A multi-year traffic forecast, which projects the amount of unicast traffic and multicast traffic at each CO for each year. Let $V_Y \subseteq V$ be the list of CO's with forecast for year Y.
(4) Maximum number of CO's served by an IO pair, $T_{max}$.
(5) Minimum number of CO's served by an IO pair, $T_{min}$.
(6) [Optional, Default $\phi$] A list of fixed IO pairs for each year, $I_Y^F$. This list can be used to reflect administrative preferences.
(7) [Optional, Default $\phi$] An existing design for year one, $$Design_1 = <I_1, \{PATH(<v,v'>, v_{VHO}) | \forall <v,v'> \in I_1\}, \{PATH(v,v') | \forall <v,v'> \in I_1\}, \{PATH(<v,v'>,u) | \forall <v,v'> \in I_1, u \in V\},$$

where the quadruple corresponds to <List of IO pairs, Diverse physical paths from each IO pair to the VHO, The physical path between each IO pair, Diverse physical paths from each IO pair to its subtending CO's>.
(8) [Optional, Default 2] The number of alternative paths, K.

Outputs: Various embodiments produce outputs that can be described as follows. The output represents a network design for each forecast year:

$$Design_i = <I_i, \{PATH(<v,v'>, v_{VHO}) | \forall <v,v'> \in I_i\}, \{PATH(v,v') | \forall <v,v'> \in I_i\}, \{PATH(<v,v'>,u) | \forall <v,v'> \in I_i, u \in V\},$$

where i indexes each forecast year. Note that the traffic from each CO is aggregated at IO pairs and the aggregated traffic will be reflected by the number of ports/paths needed from IO pairs to the VHO.

In various embodiments, processes described below dynamically place IO pairs at strategic locations while accommodating existing/fixed IO pairs to reflect administrative preferences. One embodiment has the following three phases:

PHASE 1: Computing node-disjoint paths. In this phase, the embodiment computes up to K pairs of node-disjoint routing paths from the VHO to each CO with forecast. A node-disjoint routing path is a path that does not intersect any nodes used by the other path of the path pair. The intent is to provide network redundancy and to prevent a single point of failure. Phase 1 can be executed once for all the forecast years or once for each forecast year.

PHASE 2: Satisfying operational preferences (fixed IO pairs). In this phase, the embodiment homes as many CO's to the fixed IO pairs as possible. Phase 2 is executed once for each forecast year and will not exist if there are no fixed IO pairs.

PHASE 3: Leveraging brown-field infrastructure. In this phase, the embodiment leverages the brown-field infrastructure by accommodating the incremental traffic from the CO's served by the existing IO pairs and by homing as many additional CO's to the existing IO pairs as possible. This phase will not exist if there is no pre-existing network infrastructure. Phase 3 is executed once for each forecast year.

PHASE 4: Placing new IO pairs. In this phase, the embodiment dynamically places IO pairs at strategic locations to minimize the total cost of the design while accommodating diversity and capacity constraints. Phase 3 is executed once for each forecast year.

In the following sections, processing details are provided for each of the three processing phases identified above for the example embodiment.

PHASE 1: Computing Node-Disjoint Paths.
1) In graph $G=(V,E,L,S,C_s,C_n)$, compute K pairs of node-disjoint paths from the VHO to each CO with forecast. Denote the set of paths computed in this step as P. For each forecast year Y in ascending order, execute PHASE 2 and PHASE 3 in order. Let $P^Y=P$.

PHASE 2: Satisfying Operational Preferences (Fixed IO Pairs).
2) For each IO pair $<v,v'> \in I_Y^F$, execute the following:
   a) Find the set of CO's $V_a$ such that $\forall u \in V_a$ all of the following hold:
      (1) there exists at least one node-disjoint path pair, p1 and p2 (in $P^Y$), between the VHO and node u.
      (2) p1 traverses v and p2 traverses v'; or p1 traverses v' and p2 traverses v.
      (3) The distance from u to v and u to v' along paths p1 and p2 are within a pre-determined distance limit.
   b) Execute Steps 8-11 set forth below for IO pair $<v,v'>$ with $V_a$ being the subtending CO's.

PHASE 3: Leveraging Brown-Field Infrastructure.
3) For each IO pair $<v,v'> \in I_{Y-1}$, execute the following:
   a) If the number of CO's subtending to $<v,v'>$ is less than $T_{max}$, then find a set of CO's $V_a$ such that $\forall u \in V_a$ all of the following hold:
      (1) there exists at least one node-disjoint path pair, p1 and p2 (in $P^Y$), between the VHO and node u.
      (2) p1 traverses v and p2 traverses v'; or p1 traverses v' and p2 traverses v.
      (3) u to v and u to v' along paths p1 and p2 are within distance limit.
      (4) the sub-paths from v to u and from v' to u are node-disjoint to the paths from v to the VHO and v' to the VHO.
      (5) the sub-paths from v to u and from v' to u are node-disjoint to the path between v and v'.
      For every node $\forall u \in V_a$, compute the total fiber cost from u to v and v' along each such p1 and p2 path pair, and denote the minimum total fiber cost over all of such p1 and p2 path pairs as $C_u$.
      Sort in ascending order all the nodes in $V_a$ according to $C_u$.
      Home the first X nodes in $V_a$ to $<v,v'>$, where $X=\min\{|V_a|, T_{max} - \#$ of existing CO's subtending to $<v,v'>\}$.
      Remove these X nodes from $V_y$.
      Remove all the paths which are in $P^Y$ and which are terminated at any of the X nodes.
   End If
   b) Traffic at $$<v, v'> \text{ for year } Y = \text{multicast} + \sum_{subtending\_COs} \text{unicast for year } Y.$$

c) Traffic at $$<v, v'> \text{ for year } Y - 1 = \text{multicast} + \sum_{subtending\_COs} \text{unicast for year } Y - 1.$$

d) Increase the capacity on the path from $<v,v'>$ to the VHO by the difference between year Y and year Y−1.

PHASE 4: Placing New IO Pairs.

4) Let $T'=T_{max}$, $V_{NodeToExclude}=\phi$, $I=\phi$

5) For every node $v \in V$, compute the following:
   a. A set of paths $P_v$, each of which meets all of the following criteria:
      The path is in $P^Y$.
      The path traverses node v.
      The distance from node v to the CO (one end of the path) is within the distance limit.
   b. For each path in $P_v$, find the node-disjoint path in $P^Y$. Denote the set of these node-disjoint paths as $P_v'$.
   c. For every node v' which is traversed by any of the paths in $P_v'$ and the distance between v and v' is within the distance limit, find all the paths $\overline{P}_{v'} \subseteq P'_v$ such that for any path $p \in \overline{P}_{v'}$, p traverses node v', and the distance between node v' and CO side of path p is within distance limit.
   d. For every node v' traversed by any of the paths in $P_v'$ and $|\overline{P}_{v'}| \geq T_{min}$, calculate:

$$C_{v'} = \left( W_f \times \sum_{\forall hop, h \in \{p | p \in P_v \wedge p'sNodeDisjointPath \in P_v'\} \cup \overline{P}_{v'}} L_h \times C_h + W_i \times C_{7750} \right) \times \frac{1}{\max\{|\overline{P}_{v'}|, 1\}}$$

where $W_f$ and $W_i$ are the administrative weight of fibers and network elements, respectively; $L_h$ is the distance in miles of hop h; $C_h$ is the cost per mile of hop h ($C_h$ could be the cost of spare fiber or new fiber, depending on the availability of spare fibers on hop h); and $C_{7750}$ is the cost of a network element (e.g. a router). (The operator $|\overline{P}_{v'}|$ denotes the number of distinct VHO-CO pairs in $\overline{P}_{v'}$ instead of the cardinality of $\overline{P}_{v'}$ since there could be up to K paths in $\overline{P}_{v'}$ for one VHO-CO pair.)
   e. Pair node v with node v' of the lowest $C_{v'}$, and $I = I \cup \{<v,v'>\}$.

6) Sort in ascending order all the node pairs $<v,v'>$ in I according to the cost $C_{v'}$.

7) Find the first node pair $<v,v'>$ such that $v \notin V_{NodeToExclude}$, $|P_v| \geq T'$, and $|\overline{P}_{v'}| \geq T'$. If such a node was not found, decrease T' by one. Continue to the next forecast year if $T' < T_{min}$; otherwise go to Step 7).

8) Select node v and v' as an IO pair, which serves $\min\{T_{max}, |P_v|, |\overline{P}_{v'}|\}$ CO's. If $|P_v| > T_{max}$ and $|\overline{P}_{v'}| > T_{max}$, the $\min\{|P_v|, |\overline{P}_{v'}|\} - T_{max}$ CO's farthest away from nodes v and v' will not be served by nodes v and v'.

9) For any CO u subtending to the IO pair (nodes v and v'), let $p_u^k (1 \leq k \leq K)$ be a pair of node-disjoint paths from node u to nodes v and v'. Let $$\prod_{\forall u} p_u^k$$

be a particular combination, i.e., one path pair for each CO subtending to the IO pair. Repeat for each $$\prod_{\forall u} p_u^k$$

combination the following:
a. Find two node-disjoint paths, one from v to the VHO and one from v' to the VHO. These two paths must not traverse any nodes along the paths from the pair to all the subtending CO's. These two paths can be computed as follows:
Remove all the nodes along any path in $$\prod_{\forall u} p_u^k.$$

Remove the links of capacity less than Traffic=multicast+sum of the unicast of the subtending CO's.
Introduce a dummy node connecting nodes v and v'.
If such paths can not be found, continue to the next combination of $$\prod_{\forall u} p_u^k.$$

b. Compute a path between node v and node v'. This path must be physically diverse from all the paths connecting the IO pair (nodes v and v') and all the subtending CO's. This path should be physically diverse to the paths connecting the IO pair to the VHO, if possible. The path can be computed as follows:
Remove all the nodes along any path in $$\prod_{\forall u} p_u^k.$$

Remove all the nodes along the paths connecting the IO pair to the VHO.
Run Dijkstra's algorithm from node v to node v'.
If such a path was found, calculate the total fiber cost of this solution and mark the solution as green; otherwise, add all the nodes along the paths connecting the IO pair to the VHO and run Dijkstra's algorithm from node v to node v'. If such a path can not be found, continue to the next combination of $$\prod_{\forall u} p_u^k;$$

otherwise, calculate the total fiber cost of this solution and mark this solution as yellow.

10) If no green or yellow solution was found, set $V_{NodeToExclude} = V_{NodeToExclude} \cup \{v\}$ and go to Step 7 set forth above. If any green solution was found, select the one with minimum total fiber cost; otherwise if any yellow solution was found, select the one with minimum total fiber cost. Set $V_{NodeToExclude} = \phi$.

11) Remove from $P^y$ the $2 \times K \times \min\{T_{max}, |P_v|, |P_{v'}|\}$ paths connecting the VHO to all the CO's subtending to the IO pair (node v and node v'). Generate the output and go to the next forecast year if all the CO's with forecast for this year have been served; otherwise, update fiber consumption and go to Step 5 set forth above.

There is a possibility that a large metro area, such as Los Angeles, may have multiple VHO's. The embodiment described above assumes one VHO per metro. However, we can accommodate multiple VHO's per metro as follows:

a. Repeat Phase 1 for each VHO.
b. For Phase 2, the body of the "for" loop in Step 2 needs to be executed for each VHO. The VHO that leads to a low cost for a particular IO pair will be the VHO serving that IO pair.
c. There is no change needed for Phase 3.
d. For Phase 4, the body of the "for" loop in Step 5 needs to be executed for each VHO. The VHO that leads to a low cost for a particular candidate IO pair will be the VHO serving that candidate IO pair.

In various alternative embodiments, some changes can be made in some of the processing steps described above to accommodate various differences in the network environments in particular situations. These alternative embodiments are described below.

A. Move Phase 1 inside the "for" loop right before Phase 2. This will accommodate the fiber availability on a yearly basis.

B. In Phase 3, instead of homing as many CO's to the existing IO pairs, an alternative could be to jointly consider Phase 3 and Phase 4, i.e., to home CO's to either existing IO pairs or new IO pairs based on the cost instead of always giving preference to existing IO pairs. This could significantly increase computational complexity and may potentially increase optimality.

C. In Phase 3 Step 3, instead of using the paths computed in Phase 1, an alternative could be to re-compute node-disjoint path pairs from each CO to an existing IO pair.

D. In Step 8, an alternative could be to mark all the $\min\{|P_v|, |P_{v'}|\}$ paths and globally massage them at the very end. This could significantly increase computational complexity, but it could potentially increase optimality.

E. In Step 8, an alternative could be to exit the loop after finding a green solution instead of an exhaustive search. This could reduce computational complexity without sacrifice in optimality.

F. In the case of multiple VHO's, an approximation could be to associate each CO to a particular VHO based on the paths computed in Phase 1. We can divide the CO's based on their distance to a particular VHO into three cases: (i) the CO's which are very close to a particular VHO; (ii) the CO's which are very far from a particular VHO; and (iii) the rest of the CO's.

Figure 5:
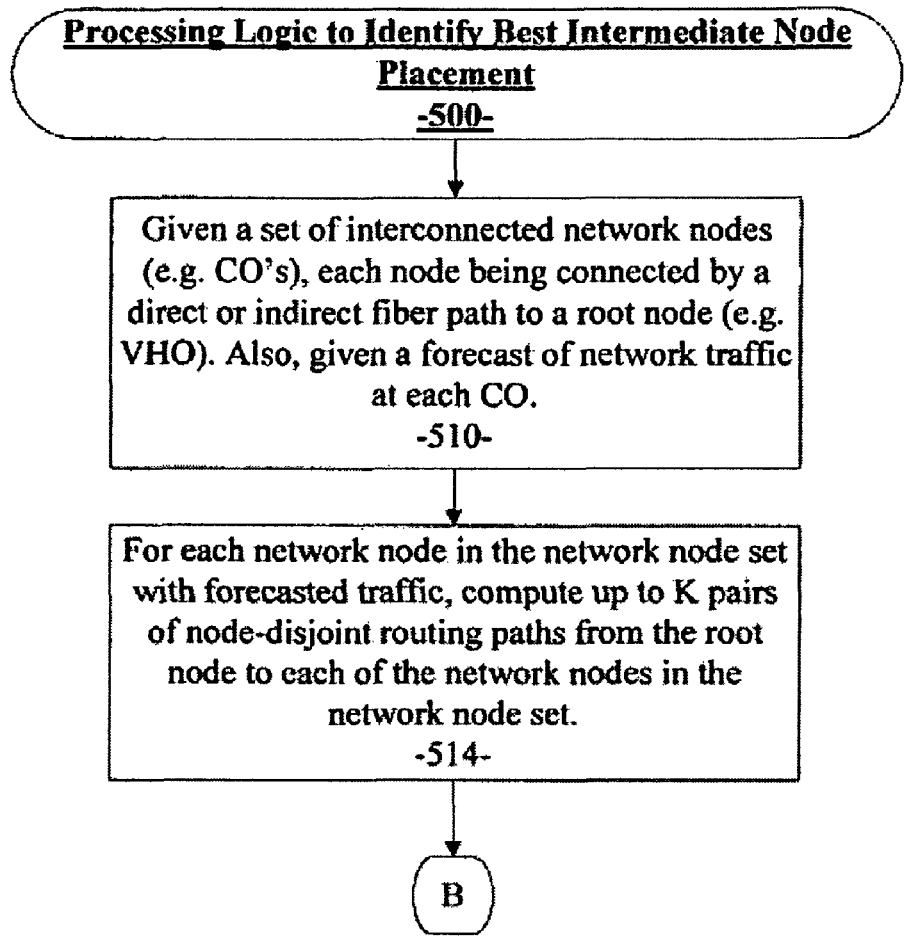
FIGS. 5-7 are flow diagrams that illustrate various example embodiments of methods in accordance with the disclosed subject matter.
Figure 6:
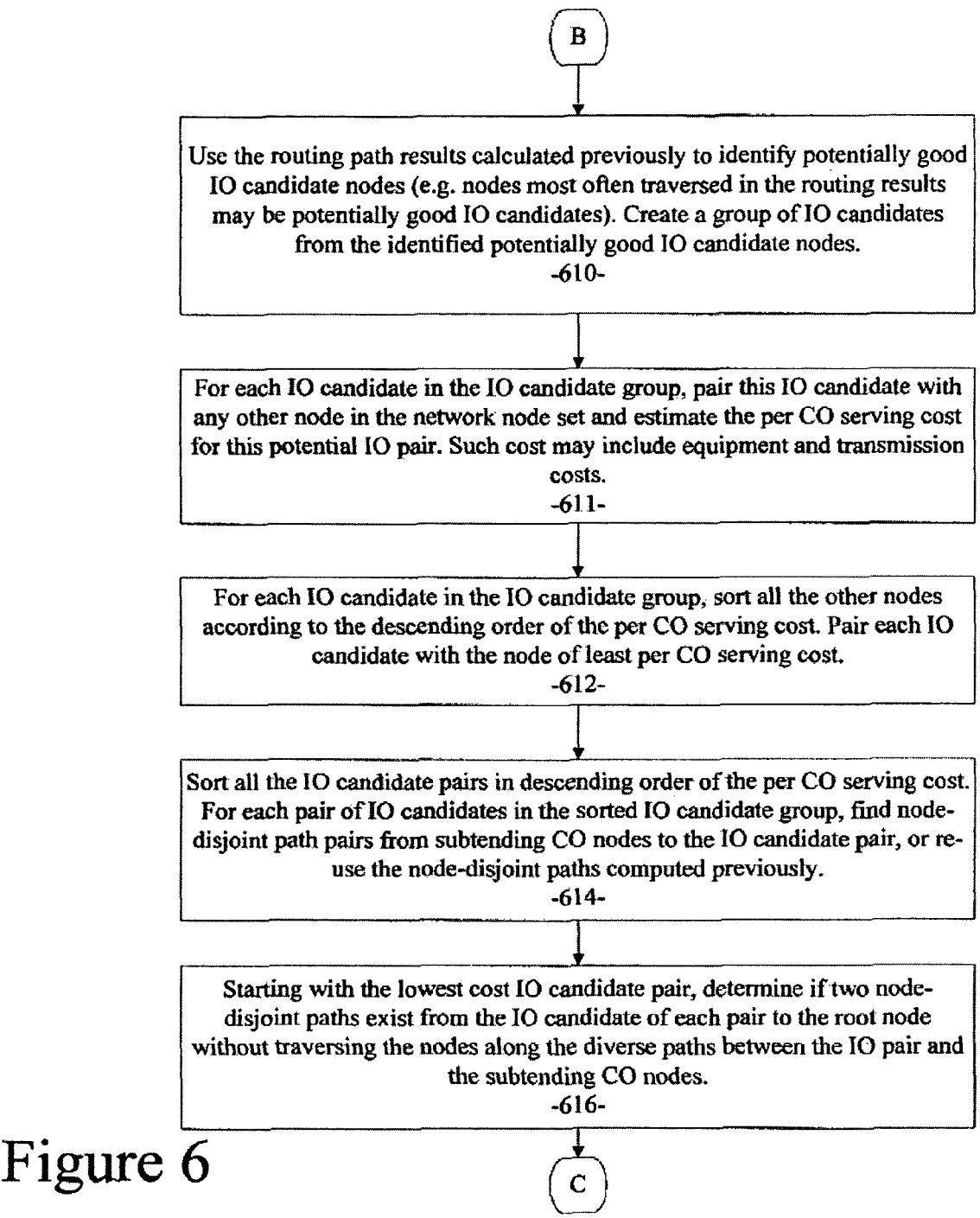
Figure 7:
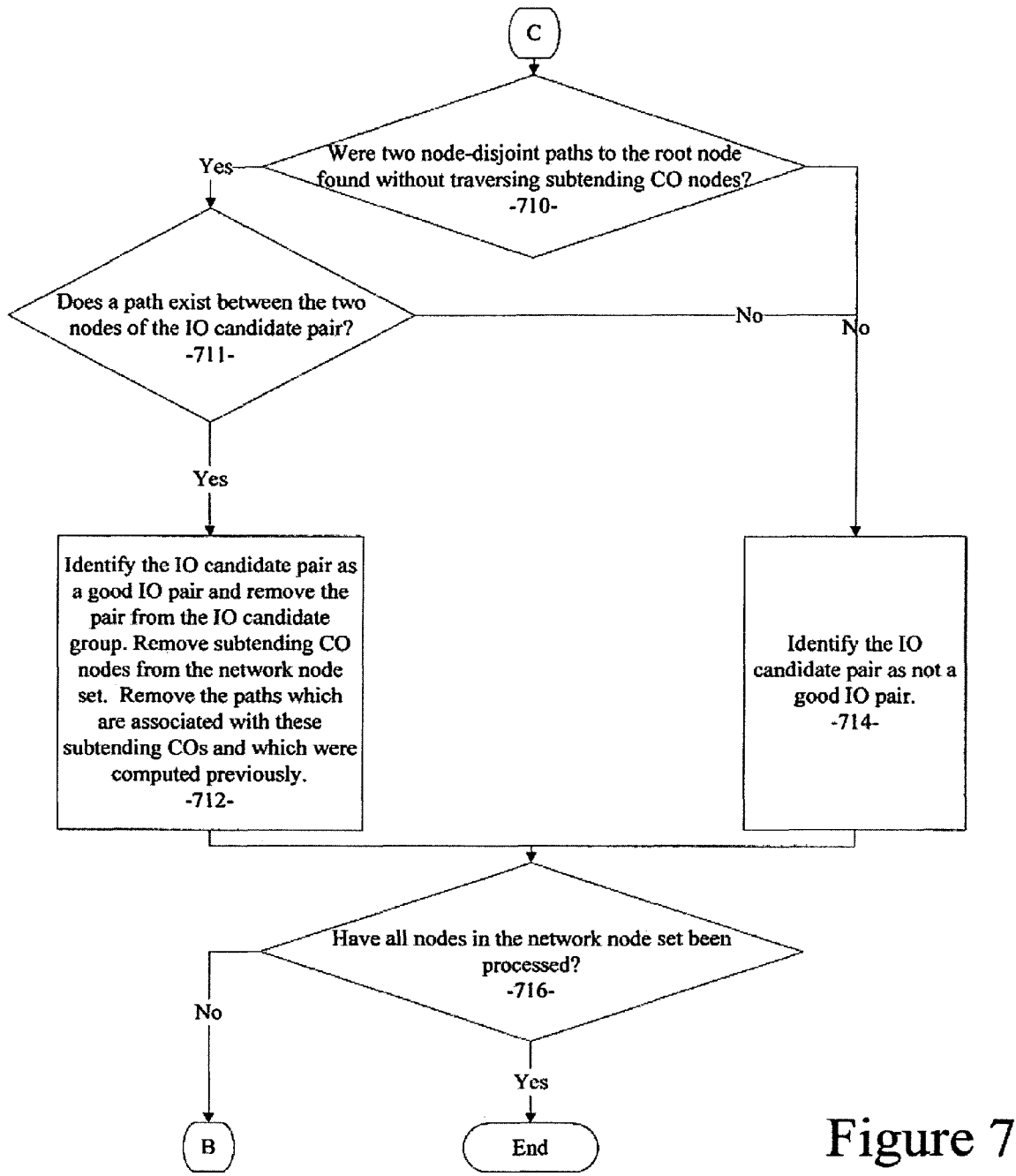

Referring now to FIGS. 5 to 7, flow diagrams illustrate the processing flow for an example embodiment. In FIG. 5, processing logic to identify the best intermediate node pair placement is illustrated. In processing block 510, an initial set of interconnected network nodes is provided. These network nodes can represent central offices (CO's) or other triple-play data and content aggregation sites. In the given network, each network node is connected by a direct or indirect path (e.g. fiber) to a root node (e.g., VHO). Such a networking configuration is well known to those of ordinary skill in art. Given a particular interconnected network configuration, a forecast of network traffic through the network and through each network node can also be provided. Given a particular network configuration and a forecast of traffic through the network, various embodiments described herein can identify the best intermediate node pair placement as will be described in more detail below.

In processing block 514, up to K pairs of node disjoint routing paths from the root node to each of the network nodes in the interconnected network node set are computed. The network node set represents all of the nodes in a given network that can be used for the transfer of network traffic. Given the computed pairs of node disjoint routing paths from the root node to each of the network nodes and the forecast of network traffic through the notes, a reasonably accurate profile of traffic through a particular network can be generated. Processing continues at bubble B illustrated in FIG. 6.

Referring now to FIG. 6, processing logic to identify the best intermediate node pair placement continues at the bubble B. Using the routing path information and network traffic profile generated in processing block 514, potentially good intermediate office (IO) candidate nodes can be identified from the set of interconnected network nodes (processing block 610). Initially, good IO candidate nodes can be those most often traversed in the routing path results computed above. Good IO candidate nodes tend to have a higher volume of network traffic routed through them. These IO candidate nodes can be initially identified using the network traffic profile generated above. In processing block 610, these potentially good IO candidate nodes are collected in an IO candidate node group.

In processing block 611, each IO candidate node in the IO candidate node group is paired with any other node in the network node set. Given the IO candidate node pairing, the cost for serving subtending network nodes from the given IO candidate node pairing is estimated. Subtending network nodes are the nodes served by a particular IO node pair. The cost estimate for serving subtending network nodes can be denoted the per central office node (CO) serving cost estimate. This estimate can include the equipment costs (e.g. routers, switches, etc.) and transmission costs (e.g. fiber and installation). In this manner, a cost estimate can be associated with each IO candidate node pairing from the IO candidate node group.

In processing block 612, for each IO candidate in the IO candidate node group, all other nodes are sorted according to the descending order of the estimated cost to serve subtending nodes. In this manner, each IO candidate node can be paired with another node having the least estimated cost to serve subtending nodes. In processing block 614, all of the IO candidate pairs in the IO candidate group are sorted in descending order based on the estimated cost to serve subtending nodes. For each pair of IO candidates in the sorted IO candidate group, node disjoint path pairs are found from subtending network nodes (e.g. CO's) to the IO candidate pair. In most cases, previously found path pairs can be used to reduce computing overhead.

In processing block 616, path pairs from each IO candidate node pair to the root node (e.g. VHO) are found. In the example embodiment, the process starts with the lowest cost IO candidate node pair in the sorted list generated above. For each IO candidate node pair starting with the lowest cost IO candidate node pair, the process looks for at least two node disjoint paths from the IO candidate node pair to the root node without traversing nodes along the diverse paths between the IO candidate node pair and subtending nodes. In this manner, the process makes sure that for the IO candidate node pair, there is a redundant and disjoint set of paths back to the root node without crossing paths to subtending nodes. In some cases, node disjoint path pairs from an IO candidate node pair to the root node may not exist. This possibility is checked in decision block 710 illustrated in FIG. 7. Processing continues at the bubble C illustrated in FIG. 7.

Referring to FIG. 7 at decision block 710, the existence of node disjoint path pairs from an IO candidate pair to the root node without traversing subtending nodes is checked. If two node disjoint paths from an IO candidate pair to the root node are found without traversing subtending nodes, processing continues at decision block 711. If two node disjoint paths from an IO candidate pair to the root node are not found without traversing subtending nodes, processing continues at processing block 714. At decision block 711, the existence of a path between the two nodes of the IO candidate node pair is checked. If such a path between the two nodes of the IO candidate node pair does not exist, processing continues at processing block 714. If such a path between the two nodes of the IO candidate node pair does exist, processing continues at processing block 712.

At processing block 712, the currently processed IO candidate node pair is identified as a good IO node pair. The good IO node pair is removed from the candidate node pair group. Subtending nodes connected to the good IO pair are removed from the network node set. Paths associated with these subtending network nodes are removed from the set of paths previously computed. The process of the example embodiment loops back to bubble B illustrated in FIG. 6 until all nodes in the network node set have been processed and one or more good IO node pairs have been identified (decision block 716). In this manner, the best and least costly (optimal) IO node pairs of a network node set can be identified The advantages of the various embodiments disclosed and claimed herein include the following:
1) Various embodiments accommodate the unique network architecture and requirements of triple-play service networks. In particular, various embodiments are applicable to network design for general switched IP video delivery.
2) Various embodiments consider the stringent diversity requirements from CO's to Intermediate Offices (IO's) to Video Headend Offices (VHO's).
3) Various embodiments account for the capacity requirements of the triple-play services and both the multicast and unicast portions of video services.
4) Various embodiments jointly consider diversity requirements and capacity requirements to minimize the overall cost of a network design in terms of equipment cost and transmission cost.

Figure 8:
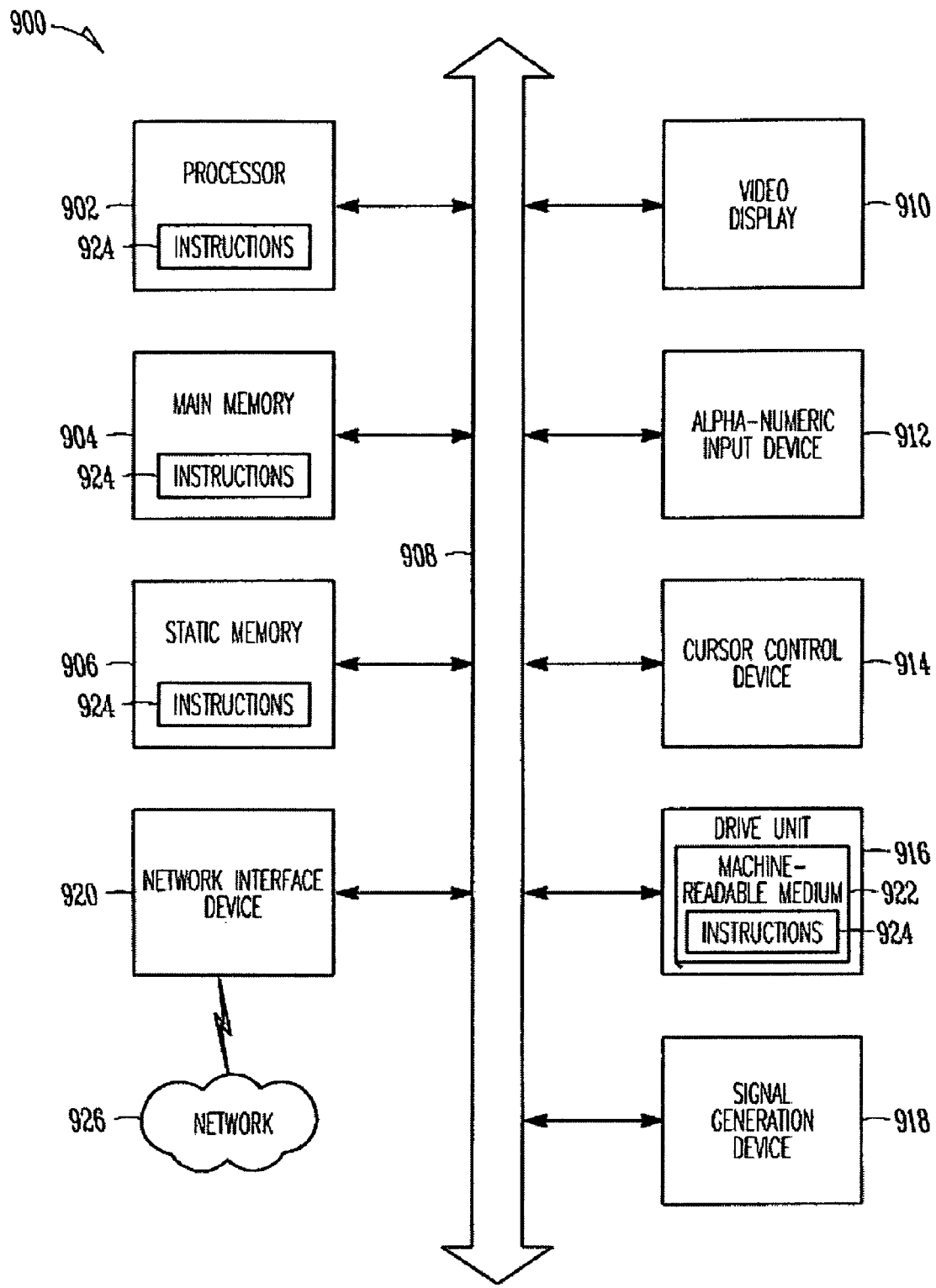
FIG. 8 illustrates an example embodiment of a computing system in accordance with the disclosed subject matter.

Referring now to FIG. 8, a diagrammatic representation of a machine is shown in the example form of a computer system 900 of a type sufficient for use in any of the example embodiments set forth herein. System 900 may include a set of instructions for causing the machine to perform any one or more of the methodologies discussed herein, that may be executed. In alternative embodiments, the machine operates as a standalone device or may be connected (e.g., networked) to other machines. In a networked deployment, the machine may operate in the capacity of a server, a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904, and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation device 914 (e.g., a mouse), a disk drive unit 916, a signal generation device 918 (e.g., a speaker), and a network interface device 920.

The disk drive unit 916 includes a machine-readable medium 922 on which is stored one or more sets of instructions and data structures (e.g., software 924) embodying or utilized by any one or more of the methodologies or functions described herein. The software 924 may also reside, completely or at least partially, within the main memory 904, and/or within the processor 902, during execution thereof by the computer system 900. The main memory 904 and the processor 902 also constituting machine-readable media.

The software 924 may further be transmitted or received over a network 926 via the network interface device 920 utilizing any one of a number of well-known transfer protocols, for example, the hyper text transfer protocol (HTTP). While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the disclosed subject matter, or that is capable of storing, encoding, or carrying data structures utilized by or associated with such a set of instructions. The term "machine-readable medium" shall accordingly be taken to include, but not be limited to, solid-state memories, optical and magnetic media.

Although the present specification describes components and functions implemented in the embodiments with reference to particular standards and protocols, the disclosed subject matter may be not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

Thus, as described above, a system and method for low cost routing in topology and reliability constrained networks is disclosed. While the example embodiments herein are generally illustrated in the environment of an IPTV system, in an alternative embodiment a cable distribution system or satellite distribution system may be used instead. Such a system may or may not use IPTV methodologies. Other available distribution techniques may be used instead, such as frequency modulation or each channel in a television frequency band, or time division or orthogonal frequency division multiplexing, for example only and not by way of limitation. Further, the IPTV may be delivered over-the-air using, for example, broadband wireless telecommunications techniques. In addition, the reliability constrained low cost routing solution described herein is not limited to a particular VHO-IO-CO topology constraint. The subject matter described and claimed herein is not limited to a triple play or multiple service type of network. Networks with more varied topology constraints can benefit from the subject matter described herein. For example, networks with multiple stages of network connections where intermediate nodes form a subset of network nodes can benefit from the subject matter described herein. Such networks can be any telecom, broadcasting, and/or data communication networks and indeed any graph models useable for many other applications.

Although the disclosed subject matter has been described with reference to several example embodiments, it may be understood that the words that have been used are words of description and illustration, rather than words of limitation. Changes may be made within the purview of the appended claims, as presently stated and as amended, without departing from the scope and spirit of the disclosed subject matter in all its aspects. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

We claim:

1. A method comprising:
   identifying fixed intermediate office node (IO) pairs;
   homing a plurality of central office (CO) nodes to the fixed IO pairs;
   generating node-disjoint routing paths from a root node to each node in a network node set, while accommodating the fixed IO pairs and homed CO nodes by removing those nodes as candidates for the node-disjoint routing paths;
   identifying potential IO candidate pairs from the generated node-disjoint routing paths;
   generating a per CO node serving cost estimate for each IO candidate pair, the generating of the cost estimate for a given IO candidate pair including estimating a cost for serving subtending CO nodes from the given IO candidate pair; and
   identifying a low cost IO candidate pair having at least two node-disjoint paths to the root node without traversing nodes along a diverse path between the low cost IO candidate pair and subtending CO nodes.

2. The method as claimed in claim 1 wherein the per CO serving cost estimate for each IO candidate pair includes an equipment cost.

3. The method as claimed in claim 1 wherein the per CO serving cost estimate for each IO candidate pair includes a transmission cost.

4. The method as claimed in claim 1 further including identifying a plurality of low cost IO candidate pairs to produce a low cost network design.

5. The method as claimed in claim 1 wherein the network node set supports voice, data, or video communication services.

6. The method as claimed in claim 1 wherein the root node is a video headend office (VHO).

7. The method as claimed in claim 1 wherein the low cost IO candidate pair receives a multicast data stream from the root node and serves a unicast data stream to subtending CO nodes.

8. The method as claimed in claim 1 wherein the low cost IO candidate pair is identified based on an existing design in a brown-field design scenario.

9. The method as claimed in claim 1 wherein the per central office node (CO) serving cost estimate is based in part on a network traffic forecast.

10. An article of manufacture comprising at least one machine readable storage medium having one or more computer programs stored thereon and operable on one or more computing systems to: identify fixed intermediate office node (IO) pairs; home a plurality of central office (CO) nodes to the fixed IO pairs; generate node-disjoint routing paths from a root node to each node in a network node set, while accommodating the fixed IO pairs and homed CO nodes by removing those nodes as candidates for the node-disjoint routing paths; identify potential IO candidate pairs from the generated node-disjoint routing paths; generate a per CO node serving cost estimate for each IO candidate pair, the generation of the cost estimate for a given IO candidate pair including estimation of a cost for serving subtending CO nodes from the given IO candidate pair; and identify a low cost IO candidate pair having at least two node-disjoint paths to the root node without traversing nodes along a diverse path between the low cost IO candidate pair and subtending CO nodes.

11. An article of manufacture according to claim 10 wherein the per CO serving cost estimate for each IO candidate pair includes an equipment cost.

12. An article of manufacture according to claim 10 wherein the per CO serving cost estimate for each IO candidate pair includes a transmission cost.

13. The article of manufacture according to claim 10 further operable to identify a plurality of low cost IO candidate pairs to produce a low cost network design.

14. The article of manufacture according to claim 10 wherein the network node set supports voice, data, or video communication services.

15. The article of manufacture according to claim 10 wherein the root node is a video headend office (VHO).

16. The article of manufacture according to claim 10 wherein the low cost IO candidate pair is further operable to receive a multicast data stream from the root node and to serve a unicast data stream to subtending CO nodes.

17. The article of manufacture according to claim 10 wherein the low cost IO candidate pair is identified based on an existing design in a brown-field design scenario.

18. The article of manufacture according to claim 10 wherein the per central office node (CO) serving cost estimate is based in part on a network traffic forecast.

19. A system comprising:
   a processor;
   a memory coupled to the processor to store information related to a network node set; and
   a low cost network design generator, operably coupled with the processor and the memory, operable to identify fixed intermediate office node (IO) pairs, home a plurality of central office (CO) nodes to the fixed IO pairs, generate node-disjoint routing paths from a root node to each node in a network node set while accommodating the fixed IO pairs and homed CO nodes by removing those nodes as candidates for the node-disjoint routing paths, identify potential IO candidate pairs from the generated node-disjoint routing paths, generate a per CO node serving cost estimate for each IO candidate pair, the generation of the cost estimate for a given IO candidate pair including estimation of a cost for serving subtending CO nodes from the given IO candidate pair, and identify a low cost IO candidate pair having at least two node-disjoint paths to the root node without traversing nodes along a diverse path between the low cost IO candidate pair and subtending CO nodes.

20. A system according to claim 19 wherein the per CO serving cost estimate for each IO candidate pair includes an equipment cost.

21. A system according to claim 19 wherein the per CO serving cost estimate for each I0 candidate pair includes a transmission cost.

22. The system according to claim 19 wherein the low cost network design generator being further operable to identify a plurality of low cost IO candidate pairs to produce a low cost network design.

23. The system according to claim 19 wherein the network node set supports voice, data, or video communication services.

24. The system according to claim 19 wherein the root node is a video headend office (VHO).

25. The system according to claim 19 wherein the low cost IO candidate pair is further operable to receive a multicast data stream from the root node and to serve a unicast data stream to subtending CO nodes.

26. The system according to claim 19 wherein the low cost IO candidate pair is identified based on an existing design in a brown-field design scenario.

27. The system according to claim 19 wherein the per central office node (CO) serving cost estimate is based in part on a network traffic forecast.

* * * * *